United States Patent

DeRenzo et al.

[11] Patent Number: 5,851,931
[45] Date of Patent: Dec. 22, 1998

[54] PAINTABLE SUBSTRATE OF NONWOVEN FABRIC AND EXTRUDED RESIN

[75] Inventors: Bonnie DeRenzo, Exeter; Robert Mahoney, Hampstead, both of N.H.

[73] Assignee: Foss Manufacturing Co., Inc., Hampton, N.H.

[21] Appl. No.: 927,139

[22] Filed: Sep. 3, 1997

[51] Int. Cl.⁶ .................................................. B32B 27/00
[52] U.S. Cl. ............................................ 442/62; 442/394
[58] Field of Search .................................. 442/61, 62, 63, 442/149, 263, 394, 398

[56] References Cited

U.S. PATENT DOCUMENTS

| | | | |
|---|---|---|---|
| 4,961,983 | 10/1990 | Smorada et al. | 442/62 |
| 5,196,247 | 3/1993 | Wu et al. | 442/62 |
| 5,382,461 | 1/1995 | Wu | 442/62 |

*Primary Examiner*—James J. Bell
*Attorney, Agent, or Firm*—Jerry Cohen

[57] ABSTRACT

Decorative arts substrate comprising a laminate as made by adhering one or two non-woven fabrics (12, 14) to a freshly extruded resin core layer (10), the laminate as a whole having characteristics of cutting without fraying, overall thickness between 0.005 and 0.020 in. including surface layer thickness(es) of 0.005–0.01 in. each, and characteristics of paintability and adhesive and controllable thermoformability of the product as a whole.

6 Claims, 1 Drawing Sheet

PAINTABLE SUBSTRATE OF NONWOVEN FABRIC AND EXTRUDED RESIN

FIELD OF THE INVENTION

The present invention relates to a synthetic paint and arts and crafts substrate products that can be made in flat or complex shapes and provided to consumers as rolls and as large and small cut panels, including slit and die cut pieces. Such products can receive paints via brush or silk-screen, as well as sewn on or adhered appliqués.

BACKGROUND OF THE INVENTION

There are existing substrates offering the same general capabilities but with lesser effectiveness than the present invention. These prior products include: canvas, canvas board, paper and poster board. Other specialty products known include "Cloth Accents" from CPE which is a 100% woven polyester fabric with a primed surface and Fredericks "Floor Canvas" a heavy stiff canvas material for floor mats. The only available composite is canvas board which adds stiffness to a paintable canvas fabric.

None of these prior art systems has been sufficient in practice to meet all the following objects of the present invention.

It is an object of the invention to provide complete sheet materials, and resultant rolls, sheets and pieces made therefrom, that are of moderate stiffness, highly resilient (won't crack when folded), thermoformable (soften when heated to 200° F.), sewable, durable, fast drying, smooth surface and/or don't need priming to accept essentially all types of paints and markers.

Related objects are the provision of practical methods and devices for production, distribution and usage of such materials.

SUMMARY OF THE INVENTION

The foregoing object's criteria are met by provision of a laminate of multiple layers, comprising an extruded resin core with one or both of its faces having a layer scrim or other low density (1–6 oz./sq/yd. for each layer) non-woven fabric layer adhered thereto. The adhesion is preferrably by direct bonding of the fabric to a freshly extruded core layer. The core resin can be any extruded plastic sheet or film, but is preferrably polyethylene in a thickness of 0.005–0.020 inches, preferrably 0.013–0.017 inches. The adhered layer or layers are each made preferrably of 0.005–0.01 in. spun lace fabric. A polyester cellulosic non woven fabric blend described below is particularly suitable.

The adhered layer(s) can be dyed. The laminate as a whole can be thermoformed. The product is smooth which allows for easy decorating. Its surfaces do not need special preparation before using and after painting or appliqué application the laminate does not crack. A user can do decorative painting with the product by first coating the product with a background color to create a barrier so that later applied layers of paint do not bleed or create a water color look. Alternatively, a user can omit base coating the surface so that paint strokes will bleed similarly to water colors. No surface preparation is needed for stamping or stencils. The product is washable if a water based varnish is put on the surface to seal it and it can then be wiped clean with a damp cloth.

The product is smoother than canvas. Raw canvas is very difficult to paint on because it needs to be primed first. After it is primed it is rough and hard to paint on. Paint on the surface can crack because it is not smooth. If one draws on primed canvas the lines can be erased, pencil lines on the raw surface of the present product do not erase easily. The present product avoids those difficulties.

The product of the invention is better than wood or slate which are hard to handle and to work. Also, a wood or slate surface needs to be sealed before the work begins. The product of the present invention can be cut with scissors without fraying decorative edges. It is flexible, easy to roll up and store and easy to layout and paint.

The product of the invention can be sold as kits for (or applied by users from non-specific forms of the product) to make table mats, floor and wall panels, giftwrap, pins, name tags, book covers, book marks, calendars, party favors, Christmas tree hangings, curtain ties, valence covers, photo mounts, weaving bases, headbands and other costume elements, and art displays generally.

Other objects, features and advantages will be apparent from the following detailed description of preferred embodiments taken in conjunction with the accompanying drawing in which:

BRIEF DESCRIPTION OF PREFERRED EMBODIMENTS

Figure 1:
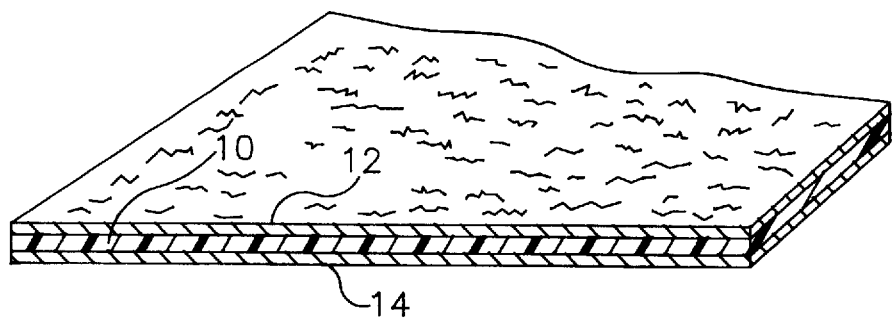
FIG. 1 is a cross-section sketch of the laminate components according to a preferred embodiment of the invention.

FIG. 1 shows a core resin foundation layer 10 and adhered layers 12, 14. The layer 10 can be 0.005"–020" thickness and with the facing plastic layers 12, 14 has a 4–15 ounch per square yard density. The core is preferably 0.015 in. low density polyethylene thermoplastic resin and the outer layer (s) each have a thickness of about 20–100% of core thickness (005–0.01 in. each) density of 1–6 ounce per square yard, and can be, e.g., DuPont's Sontara™ 8801 air laid fabric which is 50% by weight cellulose (wood pulp) fiber and 50% polyester.

Alternate forms of such outer layer(s) material can be, e.g., 100% polyester or 100% rayon.

Figure 2:
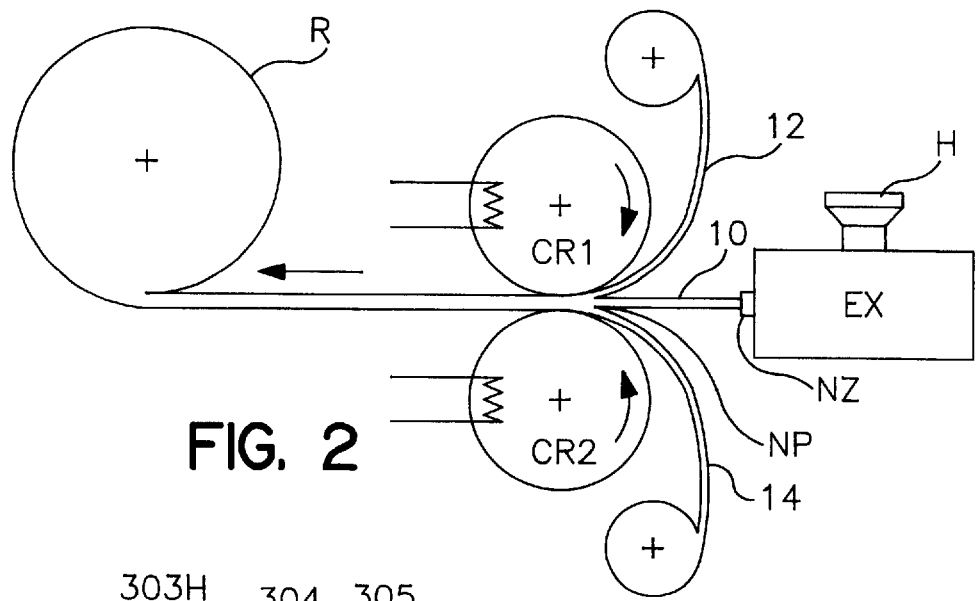
FIG. 2 is a schematic representation of process and equipment for making the laminate product.

The product width can be based on a 48 to 72" wide extrusion produced and assembled as shown in FIG. 2 and delivered for sale and usage in roll form (original large rolls or smaller re-rolls for retain distribution) or as pre-cut (die cut) flat pieces in regular geometric forms or to unique shapes. The consumers will scissor or knife cut the desired product to desired shapes or use the product as delivered. The product resists manual ripping and does not spontaneously tear, disintegrate or fray in the course of extended use or storage.

As shown in FIG. 2 the core layer 10 is made by extrusion. An extruder EX with a feed hopper H, plunger or feedscrew drive (not shown) and nozzle NZ produce the core layer as a fresh tacky surfaced wide film that emerges from the nozzle generally smooth. Its surfaces are made smoother and densified by passage of the layer while still warm through an extended length nip NP of chilled rolls CR1, CR2. At the same time rolls of nonwoven fabric are played out to pass through the nip with the core layer and be laminated thereto with substantially permanent bonds of portions of the nonwoven fabric to the core while preserving the openness, low density and loft of the fabric layers as the laminated product emerges from between the rolls and is rolled up (R) for storage and transport.

The fabric surfaces can receive paints and other coatings (with and without surface precoats or sealers and/or post-coat sealers or glazes), inks, dyes, stencil or silk screen media, glues, pastes, roller or pen inking, rub-on transfers (but not fusible iron-on transfers), hook and loop (Velcro), colored pencil, postage and decorative stamps, and other forms of coating and applique substantially all of which are well retained. Sewing thread or bulk yarns can be needled through the product without leading to extended runs or rips in the core when needling or over the course of flexing during use or storage of the product.

Cut sheets of product tend to lie flat in handling and usage because of the core characteristics. However, some curl tendency due to painting or laminating can be eliminated by preliminarily ironing the product with a household clothes iron on a low setting.

Usage of the product can be in education or recreational arts and crafts projects, decoration of wall surfaces of rooms and furnishings, placemats and coasters, area rugs and runners.

The product can be thermoformed to a permanent curved shape using methods and equipment for simultaneous heating and pressing common to the shoe industry (and also used for making other rigid complexity curved products such as auto headliners and trunk compartment liners).

The thermoformability, servability, laminatability and paintability characteristics of the product of the invention all arise from its unique configuration and fabrication history and help to define the product itself even if one or more of such characteristics are not employed to advantage in a particular use of the product.

After painting or otherwise decorating, the product can be covered with a sealer (e.g. water based polyurethane) to ensure washability.

Figure 3:
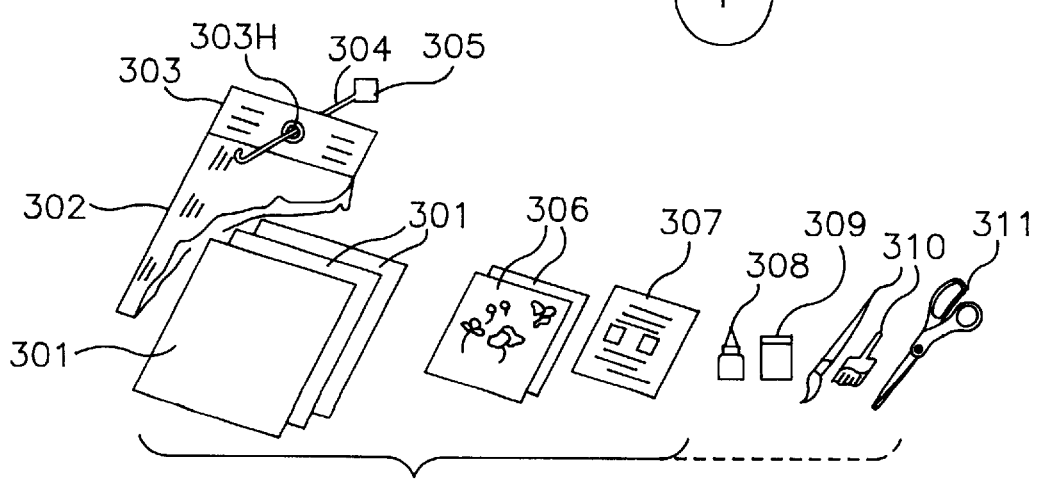
FIG. 3 is a schematic representation of a kit including the laminates product.

FIG. 3 shows a kit form for retail distribution. Multiple cut pieces 301 of the laminate or a single piece in flat or rolled form are packaged in a plastic bag 302 (shown in partially cut-away form) with a cardboard header 303 having a grommeted hole 303H for hanging on a peg 304 (which can be attached to a wall, pegboard, stud or pole via an attachment 305). One or more sheets 306 of decoration guide or stencils can be provided along with an instructional sheet 307. The latter can be combined with the sheets 306 and/or with header 303.

Optionally one or more of other components such as ink (308), paint (309), brushes (310) or cutting tools (311) can be provided in the package.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Decorative arts product comprising a laminate as made by adhering one or two non-woven fabrics to faces of a freshly extruded plastic film core layer, the laminate as a whole having characteristics of cutting without fraying, overall thickness between 0.005 and 0.020 in. including surface layer thickness(es) of 0.005–0.01 in. each, and characteristics of paintability and adhesive bondability of the fabric covered surface(s) and controllable thermoformability of the product as a whole, the product as a whole being usable as a decorative arts substrate.

2. The product of claim 1 wherein the core comprises a material selected from the class consisting of low density polyethylene polypropylene and polyester films and there are adhered layers on both surfaces.

3. The product of claim 1 wherein each fabric surfacing layer has a 1 to 6 ounce per square yard density and a holding receptivity to paints, adhesives and direct fabric applique, the product as a whole also being sewable for holding external fabric pieces applied thereto.

4. The product of any of claims 1–3 in roll form.

5. The product of any of claims 1–3 in cut piece form.

6. The product of any of claims 1–3 as a complex thermoformed shape.

* * * * *